United States Patent [19]

Dobrovolny

[11] Patent Number: 4,461,041

[45] Date of Patent: Jul. 17, 1984

[54] INTEGRATED RF RECEIVER/WAVEGUIDE

[75] Inventor: Pierre Dobrovolny, North Riverside, Ill.

[73] Assignee: Zenith Radio Corporation, Glenview, Ill.

[21] Appl. No.: 455,688

[22] Filed: Jan. 5, 1983

[51] Int. Cl.³ .............................................. H04B 1/26
[52] U.S. Cl. .................................................... 455/328
[58] Field of Search .............................. 455/325–328; 333/137, 248

[56] References Cited

U.S. PATENT DOCUMENTS

| 4,032,849 | 6/1977 | Gysel et al. | 455/327 |
| 4,276,655 | 6/1981 | Kraemer et al. | 455/327 |
| 4,348,773 | 9/1982 | Caroli | 455/328 |
| 4,412,354 | 10/1983 | Hu | 455/328 |
| 4,418,429 | 11/1983 | Roberts | 455/328 |

FOREIGN PATENT DOCUMENTS 54-71916  6/1979  Japan .................................... 455/328

OTHER PUBLICATIONS

Integrated SHF Converter Simplifies Satellite Broadcasting Paper for the "Institute of Television Engineers of Japan, Technical Group on Radio Engineering" V12, 1978, pp. 55–57.
Low-Noise 12 GHz front-end Designs for Direct Satellite Television Reception, P. Harrop, P. Lesartre, T.H.A.M. Vlek 1980 vol. 39, No. 10, pp. 257–268.
Integrated SHF Converter Formed on a Single Teflon-Fiberglass Substrate, pp. 1–7, Keiro Shinkawa, Chu-ichi Sodeyama, Masao Kamimura, Kanji Yokoyama.

Primary Examiner—Jin F. Ng

[57] ABSTRACT

The front end of a microwave receiver includes a waveguide with one wall comprised partially of the conductive ground plane of a printed circuit board. On the opposite side of the circuit board is mounted receiver front end circuitry including packaged, discrete devices and integrated circuits. An RF probe is inserted through the circuit board and into the waveguide for picking up a signal incident thereon and providing it to the aforementioned receiver front end circuitry. Incorporated in the waveguide is a cavity also partially formed from the ground plane of the receiver circuit board and containing a dielectric resonator element which, in combination with an oscillator located on the circuit board, provides a reference frequency for mixing with the received signal in generating an IF signal which is then provided to IF signal processing circuitry. The integrated RF receiver/waveguide is compact, incorporates readily available components in an inexpensively manufactured structure, and is particularly adapted for the front end of an SHF receiver such as utilized to receive satellite television signals.

11 Claims, 2 Drawing Figures

INTEGRATED RF RECEIVER/WAVEGUIDE

BACKGROUND OF THE INVENTION

This invention relates generally to RF receivers and is more specifically directed to an integrated waveguide/microwave receiver front end circuit.

Systems operating in the microwave frequency spectrum (1–100 centimeters in wavelength) have widespread applications ranging from high data rate commmercial communications networks to airborne navigation systems. In microwave systems, the radio frequency (RF) energy is guided from the transmitter through various components to the antenna or from the antenna through other components to the receiver by means of transmission lines which frequently are enclosed waveguides. These waveguides are usually constructed from metals of good conductivity, such as copper or aluminum, and are sometimes coated or plated if necessary for protection of the surface from effects such as oxidation or corrosion. Usually these lines are rectangular, circular, or occasionally eliptical in cross section.

The circuitry utilized for generating, receiving and processing the microwave signals is implemented in MIC (microwave integrated circuit) or MMIC (monolithic microwave integrated circuit) form and may be classified into three basic types: monolithic, hybrid and printed circuit (PC) board. The generally accepted distinction between the first and second approaches is the manner in which the semiconductor devices are formed in the circuit. In the monolithic approach, semiconductor devices are formed into the circuit board substrate with the circuit. In the hybrid approach, the semiconductor devices are attached to the circuit in some manner. In the monolithic approach all aspects of device and circuit design must be considered together as the entire circuit is subject to each processing step which increases the complexity and expense of manufacture of these circuits. On the other hand, in the hybrid approach the devices and circuit need have no commonality in processing prior to the attachment of the devices thereto. However, hybrid circuit fabrication requires the precise attachment of discrete semiconductor devices to the microstrip circuit which typically is done by hand and consequently results in the high cost of such systems. The third approach involving a PC board consists of a conductive circuit pattern applied to both sides of an insulating base and includes packaged, discrete devices electrically coupled by means of the aforementioned circuit pattern.

As a result of the high cost and relative complexity of the fabrication of these microwave systems, this technology has in the past been generally limited to sophisticated commercial and military communications systems. With the advent of geosynchronous satellites, however, there is a need for low cost, high performance microwave receivers capable of being produced on a large scale. Unlike today's cable television network, direct broadcast satellite-TV involves the use of powerful, high frequency satellites designed specifically for transmitting to small, inexpensive receivers owned or leased by individual television viewers. Sophisticated private receivers currently available which are capable of accessing several satellites cost as much as $20,000, and the technology used in these systems does not represent a viable approach for satellite television viewing on a generally accepted, widespread basis.

One approach to developing a low cost, high performance 12 GHz front end design for direct satellite television reception is described in Philips Tech. Rev., Vol. 39, 1980, No. 10. The outdoor unit of this receiver is mounted at the focal point of a parabolic antenna, and incorporates an input bandpass filter, a preamplifier, a mixer with a local oscillator and an intermediate frequency (IF) amplifier as individual semiconductor devices bonded to the substrate together with various other circuit board components. The input stage is positioned at the terminal end of the input waveguide of the receiver for processing the received RF signal. This approach utilizes chips which require complex wire bonding techniques for circuit board mounting. Another approach to the design of the input stage of a satellite television receiver is considered in the June 1979 edition of MSN wherein a microwave integrated circuit (MIC) requiring a relatively large area on one side of a circuit board is described. Still another approach to an integrated SHF converter for a satellite television receiver described in "Integrated SHF Converter Formed on a Single Teflon-Fiberglass Substrate" by Shinkawa et al, in "IEEE Transactions on Consumer Electronics", CE-26, No. Feb. 1, 1980, involves the positioning of the front end circuitry on the inside of the receiver's waveguide.

The present invention is intended to overcome the aforementioned cost limitations by providing a simpler approach to the design of a compact integrated waveguide/microwave receiver input circuit particularly adapted for satellite television receivers.

OBJECTS OF THE INVENTION

Accordingly, it is an object of the present invention to provide an improved microwave receiver front end.

It is another object of the present invention to provide an integrated waveguide/circuit structure for a microwave receiver capable of being manufactured inexpensively in large numbers.

A further object of the present invention is to provide low cost MIC receiver circuitry for use in a microwave receiver which forms an integral structural part of the receiver's waveguide.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
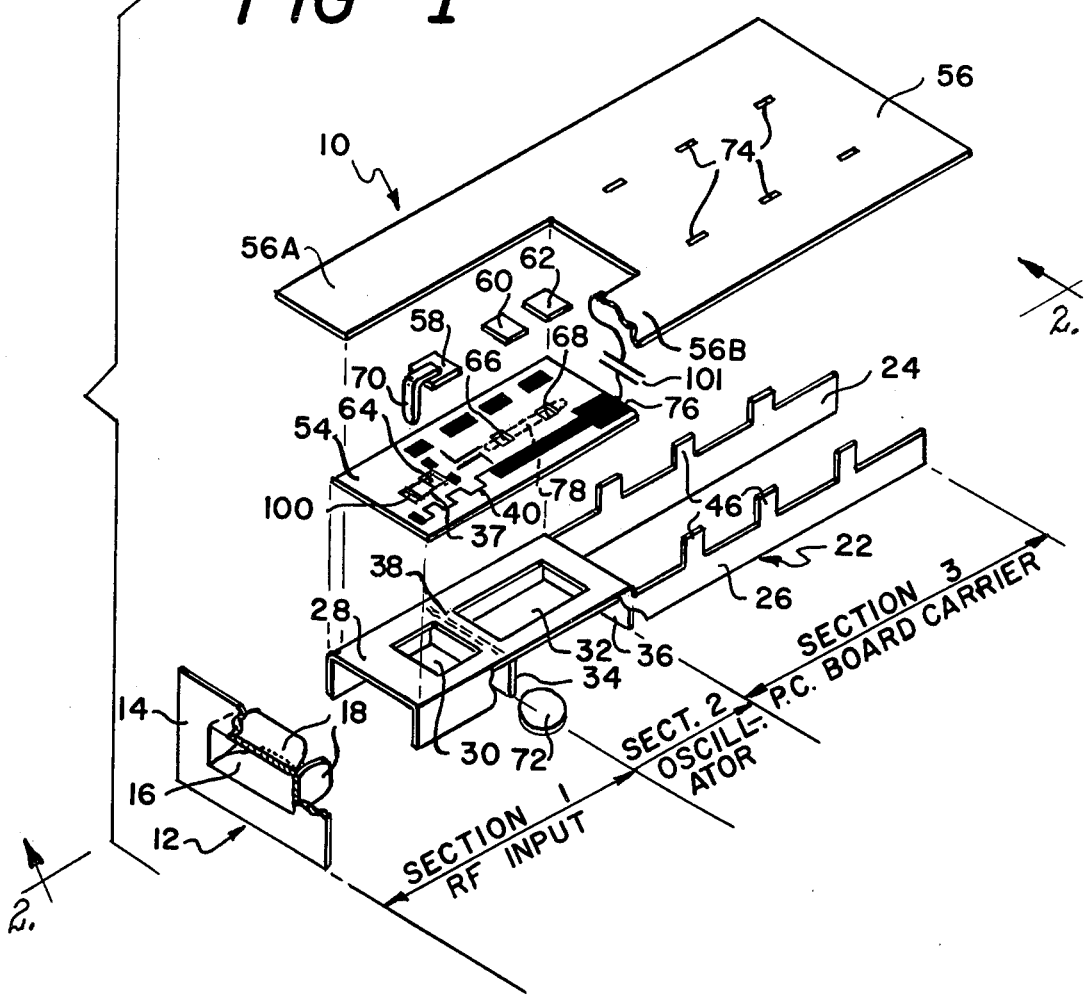
FIG. 1 is a partially cutaway, exploded perspective view of an integrated RF receiver/waveguide in accordance with the present invention.

Referring to FIG. 1, there is shown a partially cut away, exploded perspective view of an integrated RF receiver/waveguide 10 in accordance with a preferred embodiment of the present invention.

The waveguide includes a forward flange portion 12 having a sleeve 18 comprised of a plurality of walls defining a passage through which the received RF signal travels. Sleeve 18 is formed by stamping the forward plate portion 14 of the flange 12 so as to form an aperture 16 therein. The passage formed by the aperture 16 in forward plate 14 and sleeve 18 represents the input portion of the receiver/waveguide 10 through which an incident, received RF signal is directed.

Figure 2:
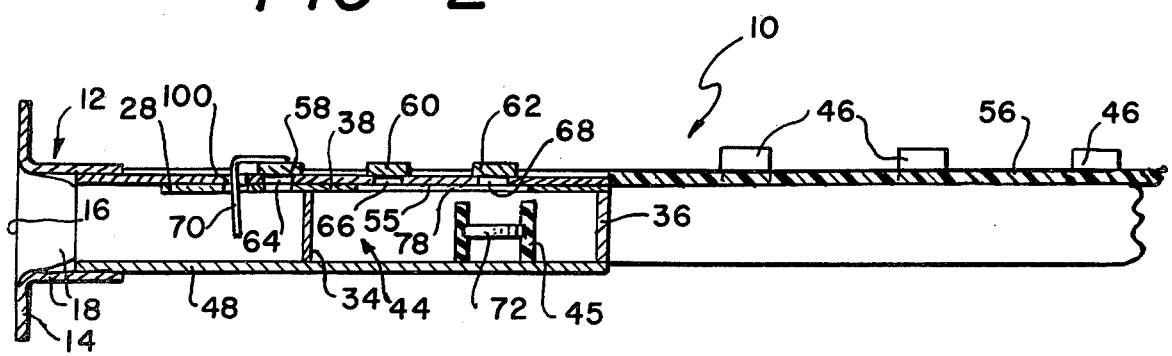
FIG. 2 is a cross sectional view of the integrated RF receiver/waveguide of FIG. 1 taken along sight line 2—2.

Coupled to the interior end portion of the sleeve 18 is the waveguide 22 of the integrated receiver/waveguide 10 which is comprised of side walls 24, 26, an upper wall 28, and a lower wall 48. Lower wall 48, which is shown in FIG. 2, is not shown in FIG. 1 for the sake of clarity. Waveguide 22 may be either a single piece of conductive sheet metal formed into a rectangular cross sectional shape or may be several flat sections of a conductive material soldered together, or joined by some other conventional means, so as to form a conduit having a generally rectangular cross section. From FIG. 2, it can be seen that the sleeve 18 of the forward portion 12 of the waveguide could be joined with waveguide 22 with conventional coupling means, such as soldering, used to provide firm coupling therebetween. From FIG. 1, it can be seen that the upper wall 28 of waveguide 22 does not extend over the entire length of the waveguide and includes apertures 30, 32 therein. The purpose and function of these apertures is explained in detail in the following paragraphs.

Mounted on the upper wall 28 of the waveguide 22 so as to cover the apertures 30, 32 therein is a microwave, or input, circuit board 54. The input circuit board 54 includes a plurality of electronic components in discrete, packaged form on an upper surface thereof. The packaged devices are represented by elements 58, 60 and 62 and respectively represent RF amplifier, mixer, and oscillator devices. The lower surface of the microwave circuit board 54 includes a conductive ground plane 55 to which various components on the upper surface of the circuit board are electrically coupled as required for proper operation of the microwave input circuit. The microwave circuit board is preferably comprised of a soft teflon-based material. Conventional plated-through holes or jumper wires may be utilized to connect circuitry on the upper surface of the microwave circuit board with the ground plane on its lower surface. The microwave circuit board 54 is securely mounted to the upper wall 28 of the waveguide 22 by means of soldering the ground plane 55 to the upper wall 28 or attachment by means of a suitable conductive epoxy sealant.

The microwave circuit board 54 includes first, second, third, and fourth apertures 100, 64, 66 and 68 therein. An RF responsive probe, an amplifier, a mixer, and an oscillator device 70, 58, 60 and 62 of the microwave receiver circuit are respectively inserted and mounted within first, second, third and fourth apertures 100, 64, 66 and 68. The RF responsive probe 70 is coupled to an RF amplifier device 58 which is, in turn, in circuit with mixer device 60 and oscillator device 62. Each of these devices in a preferred embodiment is a packaged device, relatively low in cost and easy to mount on the microwave circuit board 54. These packaged devices are attached in a conventional manner to the printed circuit pattern on the upper surface of microwave circuit board 54 so as to form a MIC (microwave integrated circuit) input circuit. Thus, the amplifier and the mixer stages 58, 60 of the microwave receiver circuit are coupled in circuit by means of a hybrid coupler while the mixer and oscillator stages 60, 62 are coupled by means of slotline 78. The use of discrete, packaged devices rather than chips of integrated devices substantially reduces the current cost of the microwave receiver of the present invention. The configuration and operation of the microwave receiver circuit is described in applicant's co-pending U.S. patent application entitled "Integrated Single Balanced Mixer/Oscillator With Slot and Hybrid Coupler", Ser. No. 456,158, filed Jan. 6, 1983, and assigned to the assignee of the present application.

Coupled to the RF amplifier device 58 and inserted through first aperture 100 so as to extend into the waveguide is the RF responsive probe element 70. The RF probe 70 is responsive to and transmits the received, incident microwave signal to the amplifier device 58 for amplification therein and subsequent processing by the aforementioned receiver front end components. In a preferred embodiment, the RF amplifier is a gallium arsenide field-effect transistor (GaAs FET) with the gate lead thereof represented as the RF probe 70 which is configured so as to extend through first aperture 100 and into Section 1 of the waveguide 22. Although shown as a single amplification stage in the figures, the present invention is not limited to this configuration and may include a plurality of input signal amplification stages. The gate lead/RF probe 70 is soldered to a pad 37 positioned on the upper side of the microwave/circuit board 54 to ensure its stable positioning thereon. The length and tilt of the RF probe 70 within waveguide 22 may be selected/adjusted to provide optimum noise matching between the waveguide and the RF amplifier device 58. In addition, a nonconductive epoxy material is used to close and seal the first aperture 100 once the gate lead/RF probe 70 is positioned therein so as to provide a hermetic seal between the inner portion of the waveguide 22 and the upper surface of the microwave/circuit board 54 upon which the various electronic devices are mounted. RF amplifier device 58 is securely mounted within second aperture 64 in the microwave circuit board 54 by conventional means. Similarly, the mixer and oscillator devices 60, 62 are securely mounted within third and fourth apertures 66, 68 by conventional means such as an epoxy adhesive or soldering in order to insure electrical continuity with adjacent conductors integral with the microwave circuit board 54. By thus mounting the various receiver circuit components in a sealed manner in the several apertures in circuit board 54, the circuitry on the upper surface of circuit board 54 is hermetically sealed from the outside environment to which the waveguide 22 is exposed.

The waveguide 22 is provided with forward and aft partitions 34, 36, which, in combination with the upper, lower and side walls thereof, define a cavity 44 within the waveguide and form Section 2 of the waveguide as shown in FIG. 1. Positioned within the cavity 44 defined by forward and aft partitions 34, 36 and the walls of the waveguide 22 is a dielectric resonator 72. The dielectric resonator 72 is mounted within cavity 44 by means of a dielectric mounting bracket 45 positioned within cavity 44 in a conventional manner. Although shown in FIG. 2 as positioned on lower wall 48, the dielectric resonator 72 could as easily be mounted by means of mounting brackets 45 to the lower surface of circuit board 54. Dielectric resonator 72 is coupled to oscillator device 62 via slotline 78 and aperture 68 by means of a mutual magnetic field. The dielectric resonator is a high Q device which functions as a frequency standard and which, in combination with oscillator device 62, generates a reference frequency. The cavity 44 serves to confine the energy of the dielectric resonator 72 for maintaining high Q operation thus minimizing the frequency drift. The combination of oscillator device 62 and dielectric resonator 72 is coupled by means of slotline 78 to the mixer device 60. The slotline 78 is shown in FIGS. 1 and 2 and is located within the upper, inner surface of the waveguide 22 in the ground plane 55 of the microwave circuit board 54. In a preferred embodiment, the slotline, or transmission line, 78 is a linear groove in the form of a slot in the circuit board's ground plane 55 which electrically couples the mixer stage 60 with the oscillator/dielectric resonator combination when these elements are properly positioned within third and fourth apertures 66, 68, respectively. The received RF signal is provided to the mixer stage 60 from the amplifier stage 58 via hybrid coupled circuitry on the upper surface of the microwave circuit board 54. Thus, an intermediate frequency (IF) signal is generated by heterodyning the received and oscillator frequency signals. The IF output from mixer stage 60 is provided to conventional integrated circuitry on the upper surface of the microwave circuit board 54 which includes the first half of a bandpass filter comprised of the grounded parallel arrangement of an inductor 40 and capacitor 76. The dimensions and hence the values of grounded inductor 40 and capacitor 76 are selected such that the first half of the bandpass filter comprised thereof is tuned to the IF center frequency. The second half of the bandpass filter includes a series coupling capacitor 101 shown in FIG. 1 in schematic form which couples the IF output of the microwave circuit board 54 to a printed circuit board 56.

Positioned immediately aft of the microwave circuit board 54 and mounted to the upper portion of the waveguide 22 is a second, printed circuit board 56 having a power supply and IF circuitry (not shown) coupled thereto. The circuit board 56 includes a plurality of apertures 74 therein through each of which is inserted a tab 46 which is then folded over the upper surface of the circuit board 56 to insure its stable mounting on the upper portion of the side walls 24, 26 of the waveguide 22. With circuit board 56 firmly mounted on waveguide 22, right and left forward portions 56A, 56B of the circuit board are positioned immediately adjacent the lateral portions of the microwave circuit board 54. Although not shown in the figure, various electronic components would typically be mounted on the upper surface of circuit board 56 for device biasing and for processing of the IF signal provided thereto. The IF signal is provided to the circuit board 56 via previously discussed coupling capacitor 101 by conventional means. Since the manner in which the IF signal generated in mixer stage 60 is provided to the circuit board 56 and the processing of this signal thereon may be conventional in nature and thus does not form a part of the present invention, this aspect of the integrated receiver/waveguide of the present invention will not be further discussed herein.

There has thus been shown an integrated RF receiver circuit/waveguide which is compact, inexpensive and can be manufactured on a large scale using conventional techniques. The integrated RF receiver/waveguide makes use of discrete, packaged components mounted on a printed circuit board which forms one wall of the receiver's waveguide. A cavity formed in the waveguide houses a dielectric resonator which, in combination with conventional circuitry on the outer surface of the circuit board, is used to generate an IF signal for subsequent processing in the receiver.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matters set forth in the foregoing description and accompanying drawings are offered by way of illustration only and not as a limitation. The actual scope of the invention is intended to be defined in the following claims when viewed in their proper perspective based on the prior art.

I claim:

1. A front end portion of an RF receiver comprising:
   a waveguide for directing and confining a received microwave signal incident on an end thereof, said waveguide having a plurality of conductive walls for facilitating the confinement and propagation of said received microwave signal therein with one of said walls having an aperture therein;
   A microwave integrated circuit (MIC) receiver mounted on a first circuit board and including a plurality of discrete devices in combination with integrated circuitry positioned on the outer surface of said one of said walls immediately exterior to said waveguide; and
   an RF responsive probe inserted through an aperture on said first circuit board and through the aperture in said one of said walls and extending into said waveguide and coupled to said MIC receiver for providing said received microwave signal thereto.

2. A front end portion of an RF receiver in accordance with claim 1 wherein said MIC receiver includes a reference frequency source and a mixer circuit coupled thereto for generating an IF signal.

3. A front end portion of an RF receiver in accordance with claim 2 wherein said MIC receiver further includes an RF amplifier coupling said RF probe to said mixer circuit for providing an amplified received microwave signal thereto.

4. A front end portion of an RF receiver in accordance with claim 3 wherein said RF amplifier includes a packaged gallium arsenide field-effect transistor having a gate lead comprising said RF responsive probe.

5. A front end portion of an RF receiver in accordance with claim 2 further including a second circuit board electrically coupled to said first circuit board and adapted to process said IF signal and to regulate DC voltages and currents provided to said first circuit board, wherein said second circuit board is mounted immediately adjacent said first circuit board on said waveguide so as to form a wall thereof.

6. A front end portion of an RF receiver in accordance with claim 5 wherein said first circuit board is capacitively coupled to said second circuit board for providing said IF signal thereto.

7. A front end portion of an RF receiver in accordance with claim 2 wherein said reference frequency source includes the combination of an oscillator device and a dielectric resonator.

8. A front end portion of an RF receiver in accordance with claim 7 wherein said waveguide includes front and rear partitions extending thereacross so as to terminate the RF input portion of said waveguide and form a cavity in said waveguide and wherein said mixer circuit and oscillator are mounted on a first, outer surface of said first circuit board and said dielectric resonator is mounted within said cavity.

9. A front end portion of an RF receiver in accordance with claim 7 wherein said first circuit board includes a conductive ground plane on the second, inner surface thereof, said ground plane including a slotline therein for coupling the combination of said oscillator and dielectric resonator with said mixer circuit for providing said reference frequency signal thereto.

10. A front end portion of an RF receiver in accordance with claim 9 wherein said first circuit board includes first, second and third apertures therein through which said RF responsive probe, said mixer circuit and said oscillator are inserted and respectively mounted.

11. An RF signal receiver comprising a circuit board having an aperture therein and on a first side thereof a conductive ground plane and on a second side thereof coupled in circuit an amplifier having an input lead responsive to a received RF signal for the amplification thereof, a reference frequency signal source and a mixer wherein said amplified received signal and a reference frequency signal are mixed for generating an IF signal, said RF signal receiver further including a waveguide having a plurality of walls defining a closed passage for confining and directing a received RF signal, means for mounting said circuit board on said waveguide such that the first side of said circuit board forms a part of one of the walls of said waveguide and means for positioning said input lead in said aperture such that said input lead extends into said waveguide for picking up an RF signal incident on said waveguide.

* * * * *